(12) United States Patent
Giudici

(10) Patent No.: US 8,490,514 B2
(45) Date of Patent: Jul. 23, 2013

(54) PEDAL-CRANK ASSEMBLY FOR BICYCLES

(75) Inventor: Raniero Giudici, Porto Sant'Elpidio (IT)

(73) Assignee: Claudio Trasatti, Fermo (IT)

( * ) Notice: Subject to any disclaimer, the term of this patent is extended or adjusted under 35 U.S.C. 154(b) by 0 days.

(21) Appl. No.: 13/386,558

(22) PCT Filed: Jul. 20, 2010

(86) PCT No.: PCT/EP2010/060505
§ 371 (c)(1),
(2), (4) Date: Mar. 22, 2012

(87) PCT Pub. No.: WO2011/009871
PCT Pub. Date: Jan. 27, 2011

(65) Prior Publication Data
US 2012/0167710 A1    Jul. 5, 2012

(30) Foreign Application Priority Data
Jul. 22, 2009   (IT) .............................. MC2009A0170

(51) Int. Cl.
*B62M 3/00*   (2006.01)
*G05G 5/06*   (2006.01)
*B62H 5/00*   (2006.01)

(52) U.S. Cl.
USPC .............. 74/594.1; 74/594.4; 74/527; 70/233

(58) Field of Classification Search
USPC ................ 74/594.1–594.7, 560, 527; 70/201, 70/204–206, 233
IPC ..................................... B62H 5/10; B62M 3/08
See application file for complete search history.

(56) References Cited

U.S. PATENT DOCUMENTS

| | | | |
|---|---|---|---|
| 5,992,191 A * | 11/1999 | Nickeas et al. ................. | 70/218 |
| 6,874,387 B2 * | 4/2005 | Vaughn ........................ | 74/594.1 |
| 7,316,302 B2 * | 1/2008 | Hogesta ........................ | 188/265 |
| 2005/0204860 A1 * | 9/2005 | Winefordner et al. ....... | 74/594.1 |
| 2006/0288818 A1 * | 12/2006 | Meggiolan .................. | 74/594.1 |
| 2007/0277569 A1 | 12/2007 | Vitali | |

FOREIGN PATENT DOCUMENTS

| | | |
|---|---|---|
| CN | 1 370 713 A | 9/2002 |
| DE | 43 42 891 A1 | 5/1994 |
| DE | 196 14 494 C1 | 12/1996 |
| DE | 202 02 956 U1 | 6/2002 |
| FR | 2 684 635 A1 | 6/1993 |
| GB | 2260301 A * | 4/1993 |

OTHER PUBLICATIONS

International Search Report for PCT/EP2010/060505 mailed Oct. 6, 2010.

* cited by examiner

*Primary Examiner* — Thomas R Hannon
*Assistant Examiner* — Yamilka Pinero Medina
(74) *Attorney, Agent, or Firm* — Lowe Hauptman Ham & Berner, LLP

(57) ABSTRACT

A pedal-crank assembly for bicycles includes a pedal configured to be used as a safety lock for the bicycle and a member for fast and easy removal of the pedal from the crank. The pedal-crank further includes a frame rotatably mounted on a pin and a shaft rotatably mounted inside the pin. The pedal has spherical bodies housed inside housing of the shaft. The pin has holes which receive the corresponding spherical bodies. A key lock is mounted to the pedal and configured to be actuated to move the shaft.

6 Claims, 5 Drawing Sheets

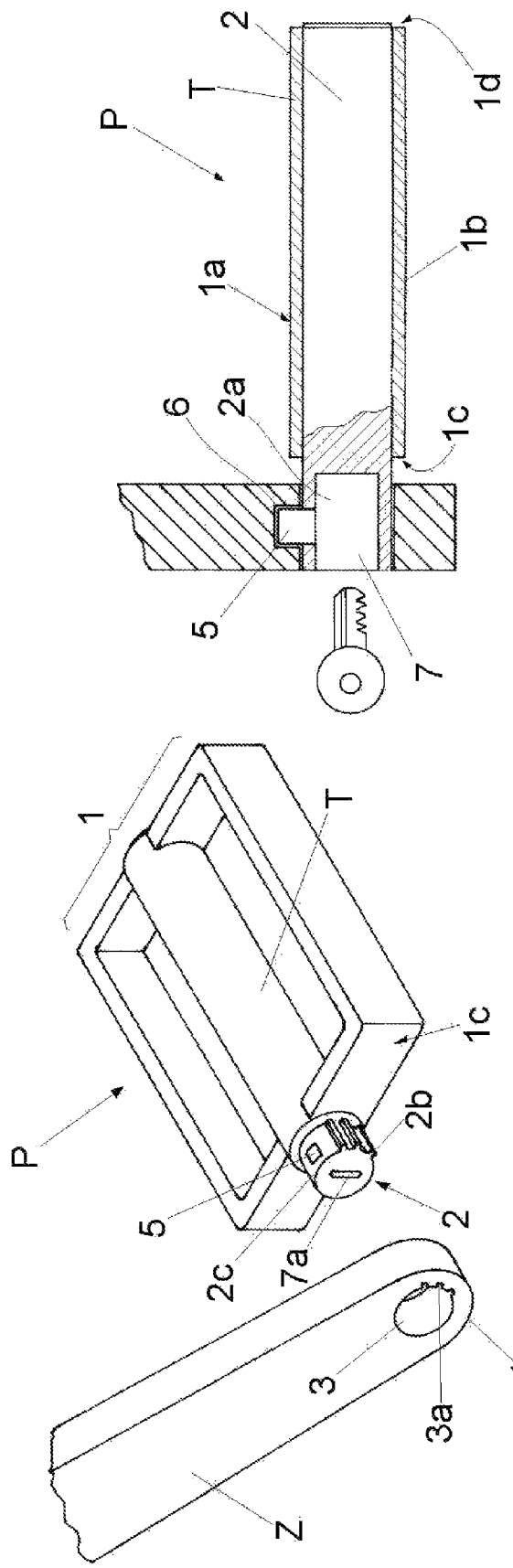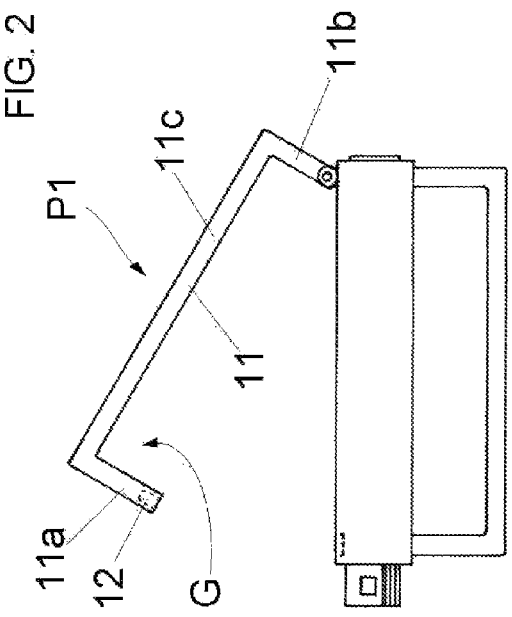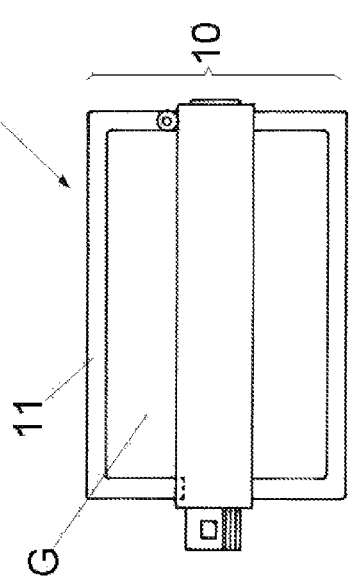

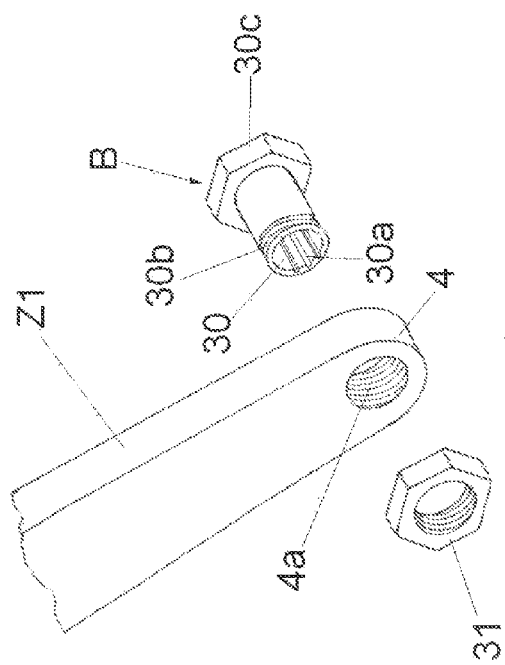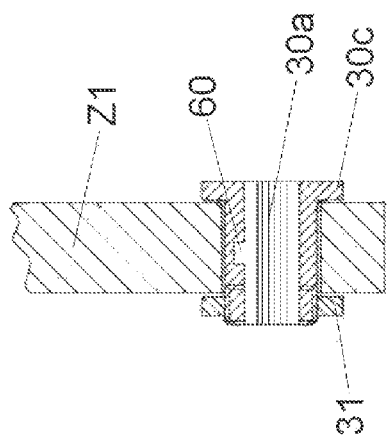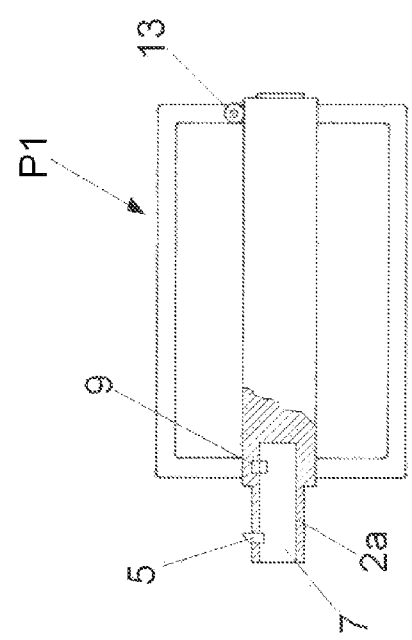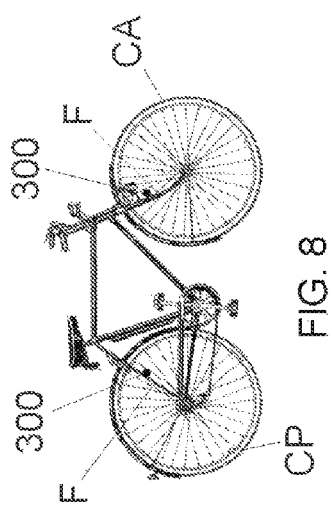

PEDAL-CRANK ASSEMBLY FOR BICYCLES

The present patent application for industrial invention relates to a pedal-crank assembly for bicycles, which comprises means for fast and easy removal of the pedal from the crank, as well as means that allow for using the pedal as safety lock for the bicycle.

Currently several safety devices are available to prevent unattended bicycles from being stolen in public places.

Said devices consist in locks with key or combination or chains provided with lock.

In any case the owners of a bicycle must purchase one of these anti-theft devices and remember to take it always with them every time they use their bicycle, to prevent their vehicle from being stolen when it is parked and left unattended for a long time in a public place without any anti-theft device.

The main purpose of the present invention consists in devising a pedal-crank assembly for bicycles, wherein the pedal is provided with means for rapid and easy removal from the crank, so that the pedal can be easily removed after parking the bicycle, thus making it unusable.

A further purpose of the present invention it to devise a pedal-crank assembly for bicycles, wherein the pedal is provided with means for coupling to the crank, which are adapted to cooperate only with one dedicated housing compatible with them.

This avoids the risk that the thief, being in front of a parked bicycle without pedals, can mount a pedal of any type on the crank to restore the functionality of the bicycle and steal it.

Another purpose of the present invention is to provide a pedal-crank assembly for bicycles, wherein the pedal is provided with a safety lock, the opening of which allows for unlocking and uncoupling the pedal from the corresponding support crank.

A further purpose of the present invention is to devise a pedal-crank assembly for bicycles, wherein, in addition to the aforesaid characteristics, the pedal is also provided with means that allow it, once it has been uncoupled from the corresponding support crank, to be used as anti-theft device of the bicycle, being especially adapted to lock the wheels of the bicycle.

These and other purposes have been achieved by the pedal-crank assembly of the invention, the main characteristics of which are illustrated in the first independent claim.

Another purpose of the present invention is an improved bicycle that is provided, at least in one of the two forks, a front and a back fork, with a housing compatible with the coupling and lock means of the pedal to the crank, so that the pedal that has been removed from the crank can be immediately mounted and locked on one of the two bicycle forks to prevent the free rotation of the wheel associated with said fork.

It is known that an ordinary pedal for bicycles consists in a small platform with basically rectangular shape, which is supported by means of the interposition of bearings, by a horizontal pin, to be fixed to the crank and around which the pedal is free to idle in both rotation directions.

According to the present invention, within the pedal-crank assembly of the invention, the coupling between the support pin of the pedal and the crank is not obtained by means of screwing, as it currently occurs, but further to male-female prismatic coupling by providing the crank with a special dedicated housing for the pin of the pedal.

The pedal of the pedal-crank assembly of the invention also comprises means for stable fixing to the crank, said tightening means being actuated after completing said prismatic coupling between pedal and crank, or more precisely between the pin of the pedal and the housing of the crank.

According to a preferred embodiment of the invention, said tightening means consist in the catch of a key lock, the keyhole of which is preferably obtained on the end section of the pin coupled with the crank.

According to another embodiment of the present invention, said pedal is provided with a mobile portion, which can be secured in a first position—in which it is not possible to access radially to the groove defined by such a profile, therefore being a sort of closed ring—or brought to a second position in which said groove is open and adapted to radially receive foreign bodies inside it.

According to this embodiment, said lock of the pedal comprises a second catch adapted to lock said mobile portion of the pedal in said first position.

It can be easily understood that the latter embodiment of the pedal has been conceived in order to allow the pedal to act as anti-theft device.

More precisely, said mobile portion has been conceived in order to embrace and trap a radius of the bicycle inside the groove in order to prevent free rotation of the wheel the radius belongs to.

It is evident that, after opening and closing said mobile portion of the pedal to trap a radius, it will be simply necessary to act on the lock in order to actuate said second catch, which is adapted to lock said mobile portion in the aforesaid first position.

For purposes of clarity, the description of the pedal-crank assembly of the invention continues with reference to the enclosed drawings, which are intended for purposes of illustration only and not in a limiting sense, wherein:

FIG. 1 is an axonometric view of the pedal of the pedal-crank assembly of the invention with crank, provided with a suitable housing to house the pin of the pedal of the invention.

FIG. 2 is a sectional view of the pedal and crank of FIG. 1 in assembled condition along a plane perpendicular to the longitudinal axis of the pin and passing through the catch of the lock;

FIGS. 3 and 4 are plan views in different positions of the pedal of the pedal-crank assembly of the invention according to another embodiment;

FIG. 5 is a sectional view of the pedal of FIGS. 3 and 4 with a plane perpendicular to the longitudinal axis of the pin and passing through the two catches of said lock;

FIG. 6 is an exploded axonometric view of the pedal-crank assembly of the invention wherein the crank is of traditional type but provided with a suitable bush for mounting of pedal;

FIG. 7 is a sectional view of the crank and bush of FIG. 6 in assembled condition with a plane perpendicular to the longitudinal axis of the bush;

FIG. 8 is a view of the bicycle of the invention provided with several housings of the pin of the pedal, some of them being situated on the two forks, and some of them situated on the rims.

FIG. 9 is a sectional view of the pedal and crank with a plane passing through the axis of said pin, which is uncoupled from the crank.

FIG. 10 is a sectional view of the pedal with a plane passing through the axis of said pin, which is coupled, but not locked, to the crank.

FIG. 10A is a section of FIG. 10 with plane X-X;

FIG. 11 is a sectional view of the pedal with a plane passing through the axis of said pin, which is coupled and locked to the crank.

Figure 9:
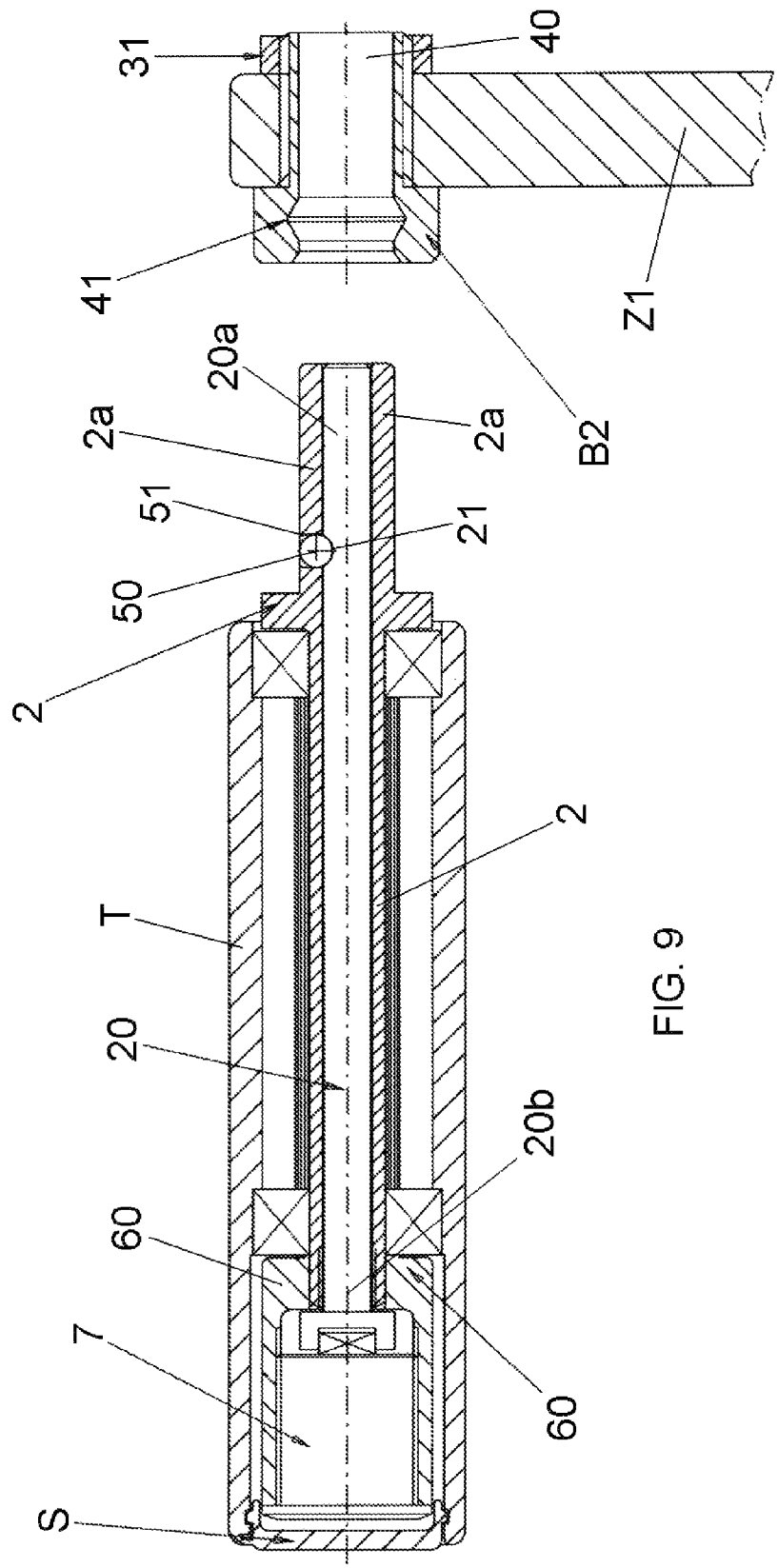
FIGS. 9 to 11 shows a third embodiment of the pedal-crank assembly of the invention.

Referring to FIGS. 1 and 3, the pedal-crank assembly of the invention comprises a pedal (P) composed of a frame (1) for foot support, provided with tubular housing (T) where a pin (2) is inserted, around which said frame (1) rotates freely.

Said frame (1) is shaped as a basically rectangular platform that comprises an upper side (1a), a lower side (1b) and two opposite transversal walls (1c and 1d), the first wall 1c) being an internal wall facing the crank (Z) on which the pedal (P) is mounted, and the second wall (1d) being an external wall facing the opposite side of the crank (Z).

According to a preferred embodiment, said pin (2) completely crosses the frame (1) and its end section (2a) protrudes from the internal transversal wall (1c) of said frame (1).

Said end section (2a) is adapted to be housed into a corresponding housing (3) obtained near the end (4) of a crank (Z).

Said end section (2a) of the pin (2) and said housing (3) are shaped so as to provide male-female prismatic coupling.

According to a preferred embodiment, said prismatic coupling is obtained with the provision of a series of teeth (2b) obtained along the lateral external surface (2c) of the end section (2a) of said pin (2); in other words, it may be said that said end section (2a) has a partially grooved profile adapted to be coupled with a corresponding grooved profile (3a) obtained on the internal surface of said housing (3).

It is evident that, choosing from time to time the number and profile of teeth, said pedal and crank of a pedal-crank assembly will not be interchangeable with the ones of a different pedal-crank assembly.

Referring to FIG. 1, according to a preferred embodiment, said grooved housing (3) is directly obtained on the crank (Z), which is directly made by the manufacturer, together with relevant pedal (P).

Referring to FIGS. 1 and 2, said pedal (P) comprises a catch (5) that is situated on the end section (2a) and can have two positions, the first one being retracted inside the housing and not protruding from the lateral surface (2c) of the end section (2a) of the pin (2), as shown in FIG. 1, the second one being ejected from the housing and protruding from said lateral surface (2c), as shown in FIG. 2.

Said housing (3) for the pin (2) is provided with a small niche (6) along the internal surface, which is adapted to receive said catch (5) when the end section (2a) of the pin (2) is completely inserted inside the relevant housing (3) and said catch (5) is in ejected position.

Said pedal (P) is also provided with lock means (7) to lock said catch (5) in ejected position, said lock means (7) being actuated only after the end section (2a) of the pin (2) is completely inserted inside the relevant housing (3), from which the pin (2) is not removed until the catch (5) is in ejected position.

According to a preferred embodiment, said catch (5) belongs to a key lock (7), as shown in FIGS. 1 and 2, the keyhole of which (7a) is obtained in the end section (2a) of the pin (2).

FIGS. 3 and 4 show an additional embodiment of the invention wherein the pedal (P1) also acts as anti-theft device, being adapted to embrace one of the radii of the rims (CA and CP) of the bicycle.

In the latter embodiment, the frame (10) of the pedal (P1) has a mobile portion (11) that is provided with a groove (G).

Said mobile portion (11) can be secured, within the configuration of said pedal (P1), in a first position—see FIG. 3—in which the groove (G) is not accessible radially; said mobile portion (11) can also be secured in a second position—see FIG. 4—in which the groove (G) is accessible radially.

Referring to FIGS. 3 and 4, the frame (10) of the pedal (P1) comprises a C-shaped mobile portion (11) comprising a pair of end wings (11a and 11 b), which are short and basically parallel, and a longer central wing (11 c).

Said mobile portion (11) is hinged to the frame (10) at the end section of the short external wing (11 b), that is to say facing the side opposite the crank.

The end of the short internal lateral wing (11a) is provided with a niche (12) adapted to receive a second catch (9) provided in the pedal (P1) and housed inside a relevant housing.

Said second catch (9) can have two positions, the first one being ejected from said housing and the second one being retracted inside the housing.

Referring to FIG. 5, when said second catch (9) is ejected and engaged in the relevant niche (12), said groove (G) is not radially accessible since the mobile portion (11) cannot rotate with respect to the pivoting pin (13).

As soon as the catch (9) is retracted inside its housing, it is possible to rotate the mobile portion (11) and make said groove (G) radially accessible, as shown in FIG. 4.

According to a preferred embodiment, said catches (5 and 9) are constantly subjected to the ejection force of a spring and the first catch (5) is shaped as a flute beak, in such a way to automatically retract as soon as it interferes with the opening of the housing (3) during the insertion of the end section (2a) of the pin (2) inside the housing (3).

According to a preferred embodiment said lock (7) incorporates and actuates both catches (5 and 9), as shown in FIG. 5.

Referring to FIGS. 6 and 7, the pedal-crank assembly of the invention comprises a crank (Z1) of normal type, provided near the end (4) with a threaded hole (4a); said pedal-crank assembly also comprising a bush (B) internally provided with a housing (30) with grooved profile (30a).

Said bush (B) is externally provided with a short threaded end section (30b).

Said bush (30) has a hexagonal stop head (30c) and is adapted to be inserted inside the traditional threaded hole (4a) where it is locked with a lock nut (31).

Obviously, the dimensions and configuration of the internal section of said bush (30) are such to obtain male-female prismatic coupling with the end section of the pin (2) of the pedal (P or P1).

In view of the above it is also evident that said bush (30) must be is provided with a niche (60) of the type of the aforesaid niche (6) in order to house the catch (5) of the lock (7).

The present invention also relates to a bicycle, shown in FIG. 8, provided with the pedal (P or P1) and relevant crank (Z or Z1).

Said bicycle could comprise a housing (300) identical to the housing (3) and directly situated on at least one of the two forks (F), in such a way that when the pedal (P or P1) is fixed on said housing (300), the pedal is interposed between two radii of the bicycle, thus preventing the wheel from rotating freely.

In this way it would be possible to use the pedal (P or P1) such as anti-theft device by simply dismounting from the crank (Z or Z1) and locking it directly on one of the forks (F) of the bicycle.

Figure 10:
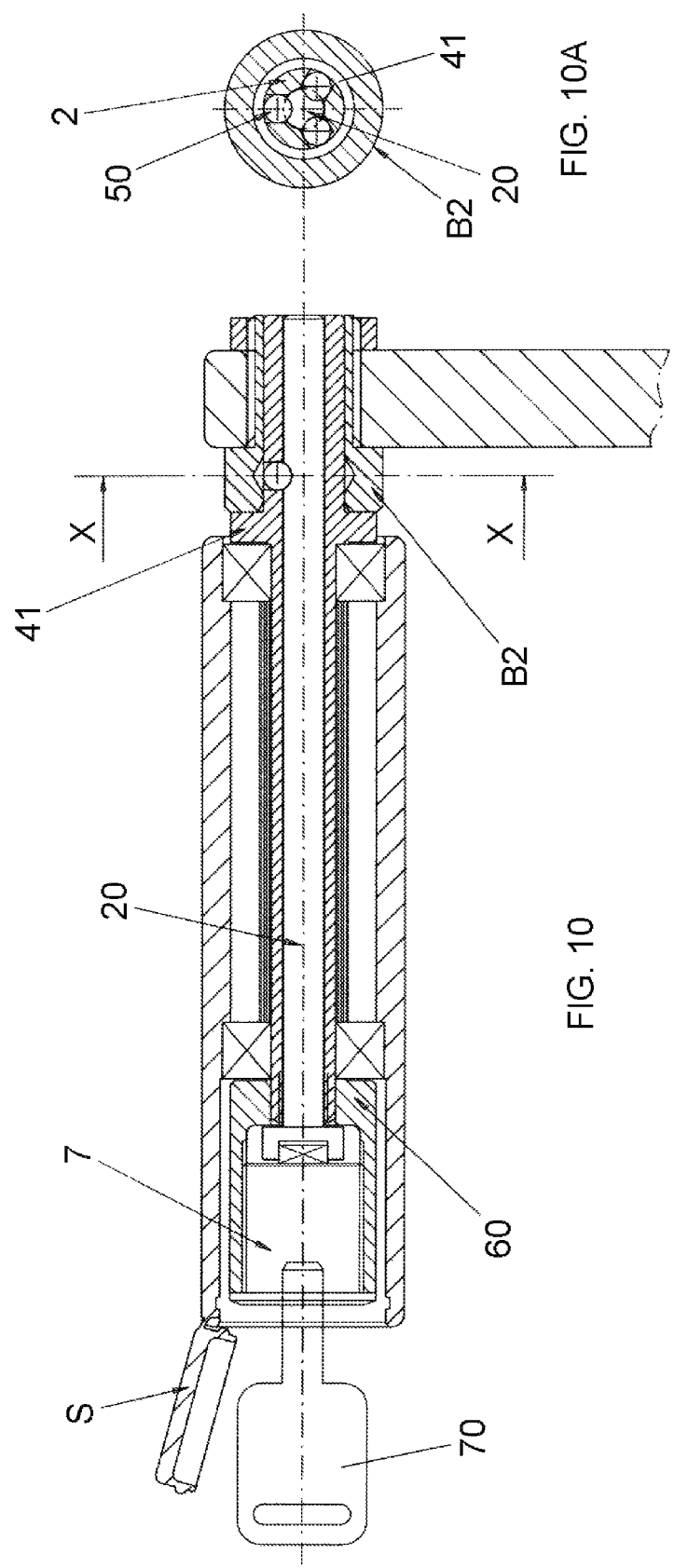
Figures 11, 11A:
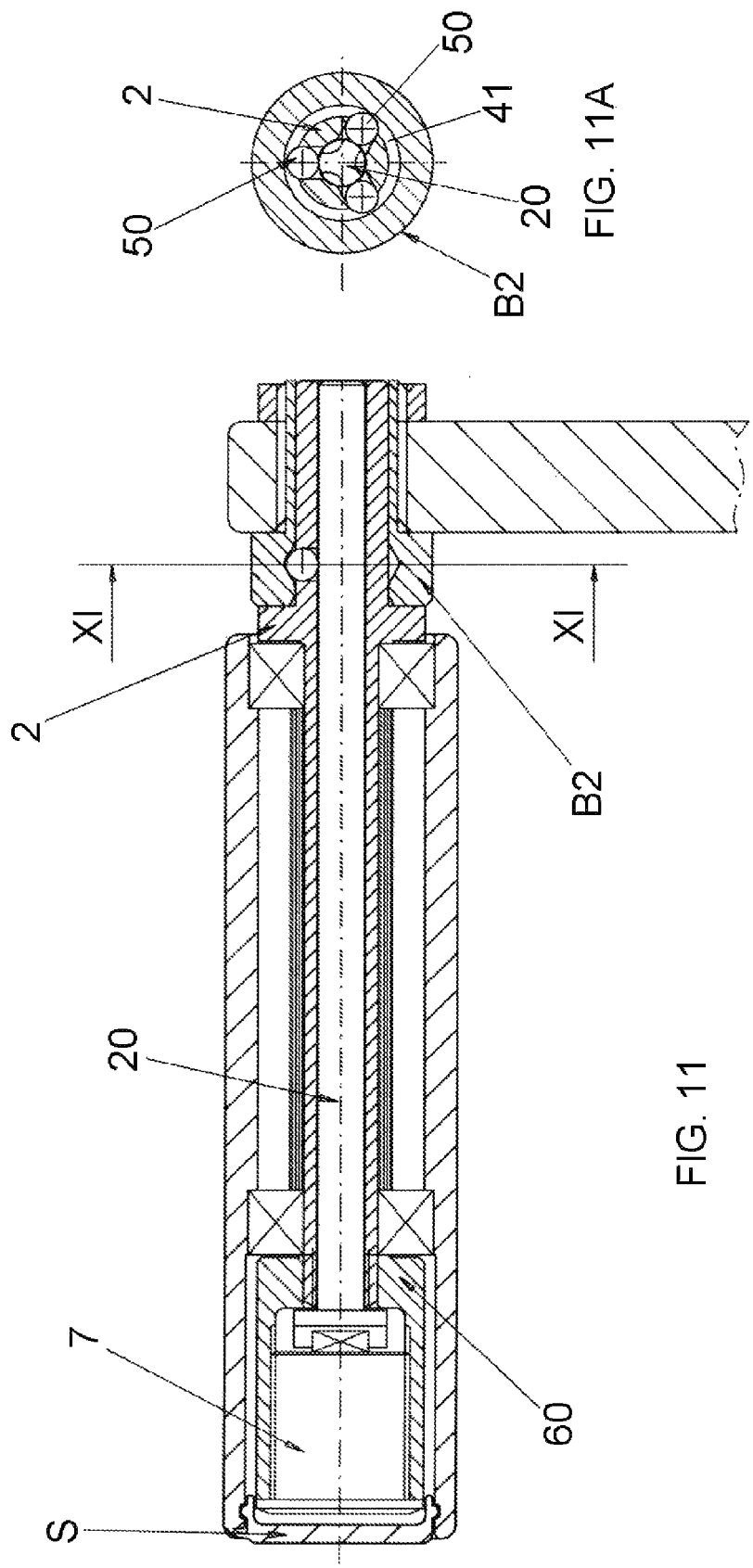
FIG. 11A is a section of FIG. 11 with plane XI-XI.

Referring to FIGS. 9 to 11 a third embodiment of the present invention is disclosed.

According to this third embodiment, exactly like the version of FIG. 6, the pedal-crank assembly comprises a crank (Z1) provided near the end (4) with a threaded hole (4a) in which a bush (B2) is screwed and locked with a nut (31); said bush (B2) being internally provided with a housing (40)

adapted to receive said end section (2a) of the pin (2) with male-female coupling. Said housing (40) is provided with an internal annular groove (41) with V-shaped cross-section.

According to this embodiment the pin (2) is of tubular structure and internally houses a rotary shaft (20) that is exactly inserted into the pin (2).

The end section (20a) of said shaft (20) is inserted into the end section (2a). Three housings (21)—preferably shaped as a segment of a sphere—are obtained on the end section (20a), along the same circumference and in regularly spaced configuration, being adapted to partially house corresponding spherical bodies (50) that for the remaining part are exactly housed inside holes (51) obtained on the end section (2a).

When the shaft (20) is rotated or axially translated by a short travel inside the pin (2), the spherical bodies (50) are ejected from the corresponding housings (21) and pushed out of the holes (51).

When the end section (2a) is inserted for its entire length inside the housing (40) of the bush (B2), the groove (41) exactly surrounds the spherical bodies (50).

When the spherical bodies (50) protrude from the holes (51) and are partially inserted in the groove (41), as shown in FIG. 11, it is impossible to remove the pin (2) from the housing (40), so that the pedal is firmly anchored to the crank (Z1).

When the spherical bodies (50) do not protrude from the holes (51), as shown in FIG. 10, it is possible to remove the pin (2) from the housing (40) and consequently detach the pedal from the crank (Z1).

The other end section (20b) of the shaft (20) is fixed to a ring (60) contained inside said tubular housing (T) and associated with a lock (7) inserted into an end of said tubular housing (T), suitably provided with a lid (S) to hide and protect said lock (7).

By lifting said lid (S) it is possible to insert the key (70) in the keyhole (7), the actuation of which makes is possible to move said ring (60) in such a way to drive said shaft (20) in a short rotation or axial translation travel.

The invention claimed is:

1. A pedal-crank assembly for bicycles, comprising:
    a crank including
        an end with a threaded hole, and
        a bush having external threads engagable in said threaded hole, and an internal housing with an annular groove; and
    a pedal including
        a frame with a tubular housing, said frame having an upper side, a lower side and two opposite transverse walls comprising a first transverse wall and a second transverse wall, the first transverse wall being an internal transverse wall facing the crank when the pedal is mounted to the crank, and the second transverse wall being an external transverse wall facing away from the crank when the pedal is mounted to the crank;
        a pin inserted into said tubular housing of the frame, said frame being freely rotatable around said pin, the pin having an end section protruding out of the internal transverse wall of said frame, and said end section of the pin being housed in the housing of the bush of the crank when the pedal is mounted to the crank, said end section of the pin being in a male-female prismatic coupling with said housing of the bush of the crank, and said pin having a hollow tubular structure, the end section of the pin having at least one through hole;
        a rotary shaft having a first end section inserted inside the end section of the pin of the pedal and a second end section opposite to the first end section in an axial direction of the shaft, and the first end section of the shaft having at least one housing corresponding to said at least one through hole of the end section of the pin;
        a fast coupling-uncoupling member for locking the end section of the pin inside said internal housing of the bush, said fast coupling-uncoupling member including a spherical body partially housed inside said at least one housing of the first end section of the shaft and partially housed in said at least one through hole at the end section of the pin, wherein said annular groove of the bush is configured to surround the spherical body when the end section of the pin is inserted inside the housing of the bush; and
        a key lock inserted in said tubular housing of the pedal along the axial direction of the shaft, the key lock associated with a ring fixed to the second end section of the shaft and located inside said tubular housing of the pedal, said key lock being configured to be actuated to move said ring to rotate the shaft about the axial direction and to move said shaft in the axial direction toward the crank so that the spherical body is locked between the pin of the pedal and the bush of the crank so as to secure the pedal with the crank.

2. The pedal-crank assembly as claimed in claim 1, wherein
    the frame of the pedal has a mobile portion with a groove,
    said mobile portion is C-shaped and has first and second end wings parallel to each other, and a central wing longer than each of the first and second end wings, and
    said mobile portion is movable between a first position in which the groove is not accessible radially and in a second position in which the groove is accessible radially.

3. The pedal-crank assembly as claimed in claim 2, wherein said pedal further comprises:
    a hinge to hinge said mobile portion to the frame at an end section of the second end wing of the mobile portion;
    a catch provided in the tubular housing of the pedal and movable between a first position in which the catch is ejected from said housing and a second position in which the catch is retracted inside said housing, and
    wherein an end of the first end wing has a niche adapted to receive said catch.

4. The pedal-crank assembly as claimed in claim 1, wherein the first end section of said shaft comprises a plurality of housings along a circumference of the first end section, and the end section of the pin comprises a plurality of through holes corresponding to the plurality of housings, and
    said fast coupling-uncoupling member includes a plurality of spherical bodies received by the plurality of through holes and the plurality of housings.

5. The pedal-crank assembly as claimed in claim 1, wherein the annular groove of the bush has a V-shaped cross-section.

6. A pedal-crank assembly for bicycles, comprising:
    a crank including
        a bush having an annular groove; and
    a pedal including
        a frame with a tubular housing,
        a pin having a hollow tubular structure and inserted into said tubular housing, wherein the pin has an end section protruding out of said frame, said end section of the pin is configured to be inserted into the bush of the crank when the pedal is connected to the crank, and the end section of the pin has at least one through hole;

a rotary shaft arranged in the pin, wherein the shaft has a first end section inserted inside the end section of the pin and a second end section opposite to the first end section in an axial direction of the shaft, and the first end section of the shaft has at least one housing corresponding to said at least one through hole of the end section of the pin;

a fast coupling-uncoupling member for locking the end section of the pin inside the bush, the fast coupling-uncoupling member including a spherical body partially housed inside said at least one housing of the first end section of the shaft and partially housed in said at least one through hole of the end section of the pin; and a key lock inserted in said tubular housing of the pedal along the axial direction of the shaft and configured to be actuated to rotate the shaft about the axial direction and to move the shaft in the axial direction toward the crank, wherein, upon rotation of the shaft, the spherical body protrudes from said at least one through hole at the end section of the pin and is partially inserted in the annular groove of the bush and so that the spherical body is locked between the pin of the pedal and the bush of the crank so as to secure the pedal with the crank.

* * * * *